United States Patent
Gupta et al.

(10) Patent No.: US 11,705,141 B2
(45) Date of Patent: Jul. 18, 2023

(54) SYSTEMS AND METHODS TO REDUCE AUDIO DISTRACTION FOR A VEHICLE DRIVER

(71) Applicant: Toyota Motor Engineering & Manufacturing North America, Inc., Plano, TX (US)

(72) Inventors: Rohit Gupta, Santa Clara, CA (US); Ziran Wang, San Jose, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/333,616

(22) Filed: May 28, 2021

(65) Prior Publication Data
US 2022/0383883 A1  Dec. 1, 2022

(51) Int. Cl.
| | | |
|---|---|---|
| *G10L 19/02* | (2013.01) | |
| *B60W 50/14* | (2020.01) | |
| *B60W 40/08* | (2012.01) | |
| *G10L 25/84* | (2013.01) | |
| *G06V 20/59* | (2022.01) | |

(52) U.S. Cl.
CPC ............. *G10L 19/02* (2013.01); *B60W 40/08* (2013.01); *B60W 50/14* (2013.01); *G06V 20/597* (2022.01); *G10L 25/84* (2013.01); *B60W 2040/0818* (2013.01)

(58) Field of Classification Search
CPC ........ G10L 19/02; G10L 25/84; B60W 40/08; B60W 50/14; B60W 2040/0818; G06K 9/00845; G06V 20/597
See application file for complete search history.

(56) References Cited

U.S. PATENT DOCUMENTS

| | | | |
|---|---|---|---|
| 7,764,189 B2 | 7/2010 | Rubins et al. | |
| 9,460,601 B2 | 10/2016 | Mimar | |
| 10,290,210 B2 | 5/2019 | Wolterman | |
| 10,322,675 B2 * | 6/2019 | Naboulsi | B60R 1/025 |
| 2002/0120374 A1 | 8/2002 | Douros et al. | |
| 2011/0050460 A1 | 3/2011 | Bruns et al. | |
| 2015/0092056 A1 | 4/2015 | Rau et al. | |
| 2015/0375756 A1 * | 12/2015 | Do | G07C 5/0808 701/1 |

(Continued)

OTHER PUBLICATIONS

Dahal et al., "TVAR modeling of EEG to detect audio distraction during simulated driving," J Neural Eng. 11 (2014) 036012, 15 pages.

(Continued)

*Primary Examiner* — Mohamed Barakat
(74) *Attorney, Agent, or Firm* — Christopher G. Darrow; Darrow Mustafa PC

(57) ABSTRACT

The disclosed technologies relate to reducing audible distractions for a driver of a vehicle. A method includes obtaining audio data based on sound detected inside the vehicle, identifying an audio event based on the audio data, determining a distraction rating for the audio event, the distraction rating indicating an estimated level of distraction caused by the audio event, and generating an alert when the distraction rating exceeds a threshold.

24 Claims, 7 Drawing Sheets

(56) References Cited

U.S. PATENT DOCUMENTS

| | | | |
|---|---|---|---|
| 2016/0046298 A1 | 2/2016 | DeRuyck et al. | |
| 2016/0118048 A1* | 4/2016 | Heide | |
| 2016/0267335 A1* | 9/2016 | Hampiholi | B60K 28/066 |
| 2017/0293508 A1* | 10/2017 | Mishra | G06F 16/24568 |
| 2018/0001899 A1* | 1/2018 | Shenoy | B60W 40/08 |
| 2018/0330178 A1* | 11/2018 | el Kaliouby | A61B 5/1079 |
| 2020/0070817 A1* | 3/2020 | Vyas | B60W 30/09 |
| 2020/0123987 A1* | 4/2020 | Dudar | F02D 41/0082 |
| 2021/0188291 A1 | 6/2021 | el Kaliouby et al. | |

OTHER PUBLICATIONS

Unknown, "Distracted Driving," Centers for Disease Control and Prevention, Mar. 2, 2021, 7 pages (last accessed May 28, 2021 at https://www.cdc.gov/transportationsafety/distracted_driving/index.html).

* cited by examiner

| Classification | Source | Num Participants | Driver Participant | Volume | Cadence | Pitch |
|---|---|---|---|---|---|---|
| 3-Passenger Argument W/O Driver | Human Voice | 3 | No | High | Medium | Medium |
| Soft Music Playing | Vehicle Speaker | N/A | No | Low | Slow | Medium |
| 2-Passenger Conversation W/Driver | Human Voice | 2 | Yes | Low | Medium | Medium |
| Ambulance Siren | External | N/A | No | High | Fast | High |
| 2-Passenger Heated Argument W/O Driver | Human Voice | 3 | No | High | Fast | High |
| ... | ... | ... | ... | ... | ... | ... |

FIG. 5

SYSTEMS AND METHODS TO REDUCE AUDIO DISTRACTION FOR A VEHICLE DRIVER

TECHNICAL FIELD

The subject matter described herein relates, in general, to systems and methods for reducing audio distraction for a driver of a vehicle, and more particularly, to an audio monitoring system that can analyze sound detectable from within a vehicle cabin, identify audible distractions, and execute responsive action to reduce the audible distractions.

BACKGROUND

A driver of a vehicle may be distracted from applying full attention to the task of operating the vehicle by various things, such as a phone call, text message, weariness, etc. Due to the high number of accidents that occur from distracted driving, many inventions and devices are directed to preventing such distractions. For example, a cell phone may automatically detect when it is in a vehicle and switch to a silent mode so as to not allow text messages to distract the driver. A vehicle may include a camera or a body sensor in the vehicle cab to detect driver drowsiness and provide an alert or automatically shut down the vehicle when the driver is determined to be too drowsy to safely operate the vehicle. However, there are many other types of possible distractions that capture a driver's attention and lead to a dangerous situation for the driver and any passengers of the vehicle.

SUMMARY

The disclosed systems and methods detect audio events or situations that can potentially distract a driver of a vehicle and, in response, execute remedial actions to reduce, mitigate, or eliminate the distracting event.

In one embodiment, audio sensor to generate audio data based on sound detected inside a vehicle cabin. The audio monitoring system further includes a processor and a memory, communicably connected to the one or more processors, storing: a monitoring module including instructions that, when executed by the processor, cause the processor to identify, based on the audio data, an audio event and determine a distraction rating for the audio event, the distraction rating indicating an estimated level of distraction caused by the audio event, and an alert module including instructions that, when executed by the processor, cause the processor to generate an alert when the distraction rating exceeds a threshold.

In another embodiment, a method for detecting and reducing audio distraction includes obtaining audio data based on sound detected inside the vehicle, identifying an audio event based on the audio data, determining a distraction rating for the audio event, the distraction rating indicating an estimated level of distraction caused by the audio event, and generating an alert when the distraction rating exceeds a threshold.

In another embodiment, a non-transitory computer-readable medium for detecting and reducing audio distractions includes instructions that, when executed by one or more processors, cause the one or more processors to obtain audio data based on sound detected inside the vehicle, identify an audio event based on the audio data, determine a distraction rating for the audio event, the distraction rating indicating an estimated level of distraction caused by the audio event, and generate an alert when the distraction rating exceeds a threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5 illustrates an example table of extracted features, categorizations and classifications, according to the disclosed embodiments.

DETAILED DESCRIPTION

Figure 1:
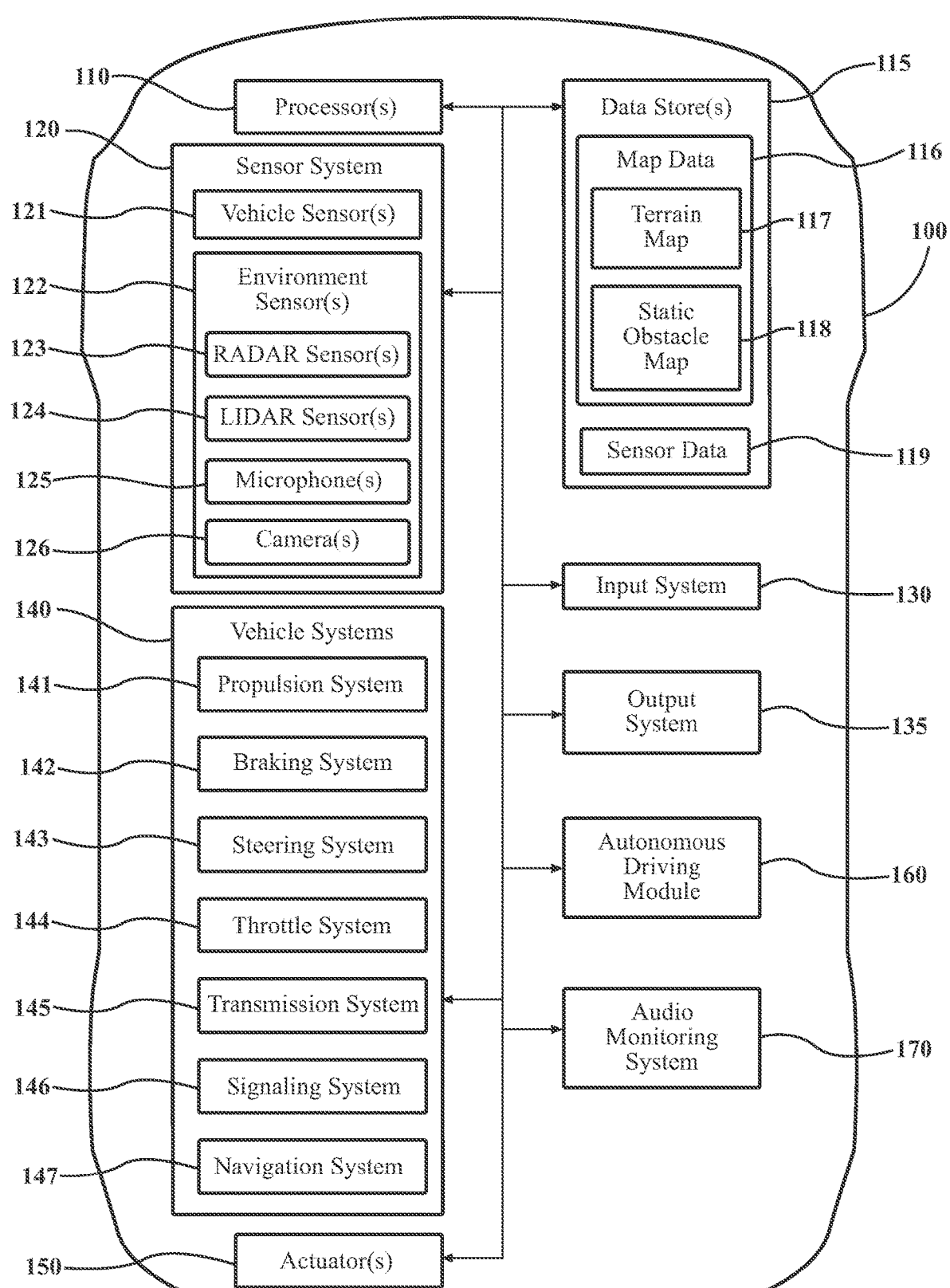
FIG. 1 illustrates one embodiment of a vehicle within which systems and methods disclosed herein may be implemented.

Systems, methods, and embodiments associated with detecting audio events that can dangerously distract a driver of a vehicle and executing remedial action to reduce such distractions are disclosed. In one or more embodiments, the disclosed audio monitoring system can capture audio data indicating sounds that are detectable from within the vehicle cabin and thus are within the hearing range of the driver. The sounds may be generated by a mix of various sources located inside and/or outside of the vehicle. For example, the sounds can include one or more of music from a media system of the vehicle, voices of passengers talking inside the vehicle, construction sounds from outside of the vehicle, etc.

In certain situations, audio events can present a significant and potentially dangerous distraction to a driver of a vehicle by drawing attention of the driver away from the task of driving, even if only for a momentary lapse. An 'audio event', as used herein, refers to sounds generated by or associated with an identifiable event. The event may be momentary or continuous. Audio events can include, for example, an argument between passengers of the vehicle, an argument between the driver and a passenger, loud music, an argument between the driver and an individual via a phone call, a loud sound from outside of the vehicle such as heavy machinery or a street show, etc.

However, not all audio events are inherently dangerous distractions. To the contrary, a driver is expected to and indeed must be capable of operating a vehicle safely through a myriad of audio events, including sounds from other vehicles, light conversations with passengers, a radio show, etc. Accordingly, audio events can fall along what may be referred to herein as a scale of distraction. Along the scale of distraction, some audio events are acceptable and do not rise to the level of potentially dangerous distraction, while others are above a threshold of acceptability and can distract the driver to the point that an accident may occur.

An environment that the driver is operating the vehicle within can be a factor in determining the level of distraction that is considered acceptable at a given moment in time. For example, when the driver is operating the vehicle in a snowstorm, an above average level of attention may be required to navigate the situation safely. Thus, for example, an audio event such as a light conversation with multiple passengers may be acceptable in one environment (e.g., driving on an empty highway with no inclement weather), but qualify as a potentially dangerous distraction in another (e.g., a heavy downpour of rain on a winding mountain road).

To address these and other issues related to handling potentially distracting audio events, in one or more embodiments the disclosed audio monitoring system can process audio data generated from sounds detected within a vehicle cabin, classify components of the audio data, determine whether the classified components indicate a likelihood of a distracting audio event occurring, and execute a responsive action when a distracting audio event is detected to mitigate distraction.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered, multi-wheeled transport or vehicle that can be operated by a driver who may be subject to distracting audio events and thus may benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2, 3A, 3B, 4-6 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes an audio monitoring system 170 that functions to automatically detect, analyze, and classify audio events based at least in part on sensor data. The audio monitoring system 170 can execute responsive actions to mitigate distractions that may be caused by the audio events that are estimated or rated to be dangerously distractive.

In one or more embodiments, the audio monitoring system 170 obtains the sensor data from one or more sensors such as a RADAR sensor 123, a LIDAR sensor 124, or a camera 126 of the environment sensors 122. The sensor data indicate one or more environmental conditions, such as weather conditions (e.g., rain, snow, clear, etc.), traffic conditions (e.g., heavy traffic, light traffic, no traffic, etc.), and road conditions (e.g., slick road, dry road, curvy road, etc.).

While the audio monitoring system 170 is depicted as a standalone component, in one or more embodiments, the audio monitoring system 170 can be integrated with another component of the vehicle 100, such as the autonomous driving module 160 or other drive control system of the vehicle 100. For example, in one or more embodiments an autonomous driving module 160 can automatically activate the audio monitoring system 170 upon detecting a switch to manual operation of the vehicle 100. In one or more embodiments, the audio monitoring system 170 can be integrated with a cloud-based analysis engine. The noted functions and methods will become more apparent in the following discussion of the figures.

Figure 2:
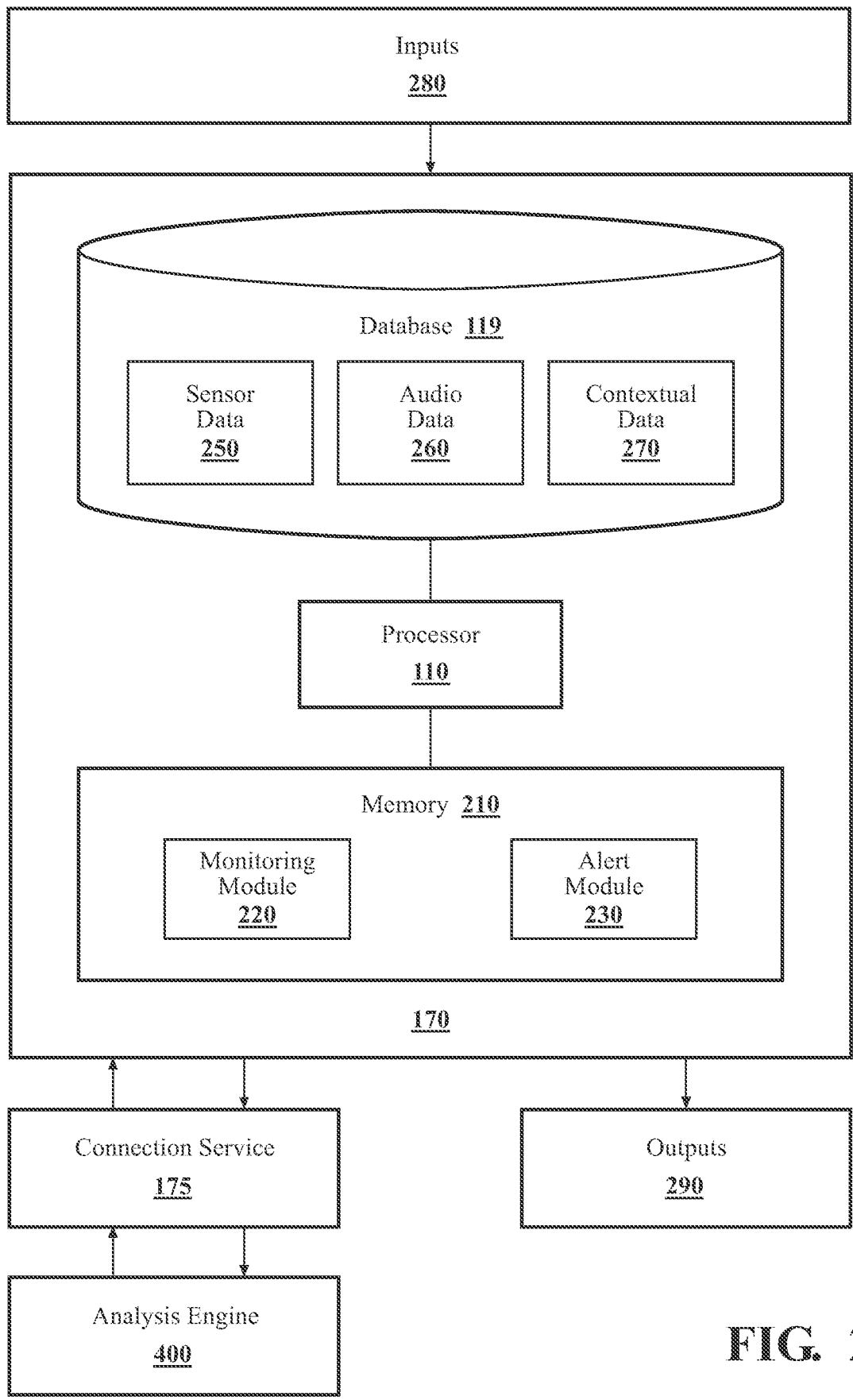
FIG. 2 illustrates one embodiment of an audio monitoring system according to the disclosed embodiments.

With reference to FIG. 2, one embodiment of the audio monitoring system 170 of FIG. 1 is illustrated. The audio monitoring system 170 can include, or be connected to, a connection service 175 and an analysis engine 400. The audio monitoring system 170 is further shown including a processor 110 and a database 119 from the vehicle 100 of FIG. 1. The processor 110 may be a part of the audio monitoring system 170, the audio monitoring system 170 may include a processor separate from the processor 110 of the vehicle 100 or the audio monitoring system 170 may access the processor 110 through a data bus or another communication path.

The audio monitoring system 170 includes the database 119 that stores, among other things, sensor data 250 (e.g., data received from the environment sensors 122), audio data 260 (e.g., data received from audio input devices such as microphones 125, etc.) and contextual data 270 (e.g., data that indicate contextual information regarding the vehicle 100 and the environment), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to modules 220 and 230. The database 119 is configured with routines that can be executed by the processor 110 for analyzing stored data, providing stored data, organizing stored data, and so on. Thus, in one embodiment, the database 119 stores data described above (as well as other data) used by the modules 220 and 230 in executing various functions.

Additionally, the audio monitoring system 170, in one or more embodiments, includes a memory 210 that stores a monitoring module 220 and an alert module 230. The memory 210 can be constructed as a random-access memory (RAM), read-only memory (ROM), a hard-disk drive, a flash memory, or other suitable memory for storing the modules 220 and 230. The modules 220 and 230 are, for example, constructed as computer-readable instructions that when executed by the processor 110 cause the processor 110 to perform the various functions disclosed herein.

The audio monitoring system 170 can receive various inputs 280 and store and/or process the inputs 280, e.g., such as sensor data 250 generated by and received from environment sensors 122. The audio monitoring system 170 can further analyze inputs 280 in real time to identify audio events. The audio monitoring system 170 can generate outputs 290, for example, commands to the activate one or more audio and/or visual alert components of the vehicle 100.

The monitoring module 220 is generally constructed including instructions that function to control the processor 110 to identify, based on the audio data 260, an audio event and to determine a distraction rating for the audio event. The distraction rating indicates an estimated level of distraction caused by the audio event based on categorization and classification, as will be discussed further below. In one or more embodiments, the distraction rating can further be based on a weighted formula that takes one or more factors into account, such as the type/classification of the audio event, intensity of the audio event, and the participants of the audio event.

In one or more embodiments, the monitoring module 220 can determine or obtain a classification of the audio event and determine the distraction rating based at least in part on the classification. The classification of the audio event can indicate a source and/or nature of the audio event. For example, an audio event can be classified as human speech conversation, conversation between two individuals, music, vehicle sounds, external sounds, etc. In one or more embodiments, the classification can also indicate an intensity of the audio event, such as loud music, soft music, human speech yelling, human speech talking softly, etc.

In one or more embodiments, the monitoring module 220 can determine or obtain the classification of an audio event by processing the audio data for transmission and transmitting the audio data in real time to an analysis engine. In one or more embodiments, the analysis engine can be a cloud-based analysis engine or an analysis engine operated onboard the vehicle 100, e.g., stored in the database 119 and executed by the processor 110.

The alert module 230 is generally constructed including instructions that function to control the processor 110 to generate an alert when the rating exceeds a threshold. In one or more embodiments, the alert module 230 can determine a type of alert to generate based on the one or more factors such as the classification of the audio event, the rating of the audio event, and environmental factors, such as weather and/or road conditions. In one or more embodiments, the alert module 230 can determine the threshold based at least in part on the classification of the audio event and/or the environmental factors.

Figure 3A:
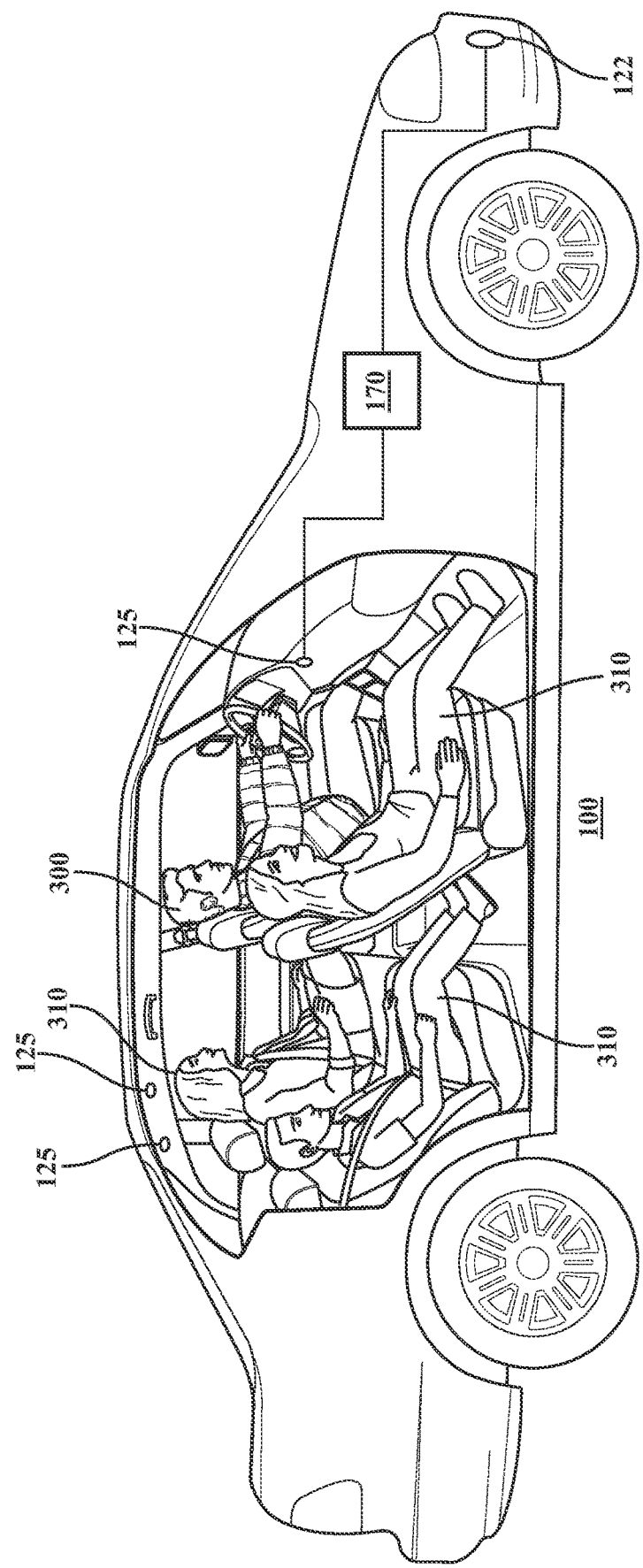
FIG. 3A illustrates a cutaway side view of a vehicle implementing an audio monitoring system according to the disclosed embodiments.

FIG. 3A illustrates an example scenario in which the disclosed audio monitoring system 170 can detect an audio event, classify and rate the audio event, and execute a responsive alert to mitigate a distraction that may be caused by the audio event. FIG. 3A illustrates a cutaway side view of the vehicle 100 in operation and having the disclosed audio monitoring system 170 installed. A driver 300 is manually operating the vehicle 100. Passengers 310 are present in the vehicle 100. Microphones 125 are installed within the cabin of the vehicle 100 to detect sound from within the cabin of the vehicle 100 and generate audio data 260. The vehicle 100 also has environment sensors 122 (e.g., one or more of a RADAR sensor 123, a LIDAR sensor 124, or a camera 126 from FIG. 1) are installed to generate sensor data 250 indicating aspects of the environment around the vehicle 100. The audio monitoring system 170 obtains audio data 260 from the microphones 125 and sensor data 250 from the environment sensors 122.

Numerous audio events may occur while the driver 300 is operating the vehicle 100. For example, the passengers 310 can engage in conversations, play music, play games, etc. In one or more embodiments, the audio monitoring system 170 (e.g., monitoring module 220 of FIG. 2) continually obtains audio data 260 from the microphones 125 and processes the audio data 260 in real time to identify audio events that may distract the driver 300.

In one or more embodiments, the audio monitoring system 170 (e.g., monitoring module 220) inputs the audio data 260 into an analysis engine that identifies and classifies audio events indicated by the audio data 260. The monitoring module 220 can determine ratings for audio events based at least in part on the classification.

Figure 4:
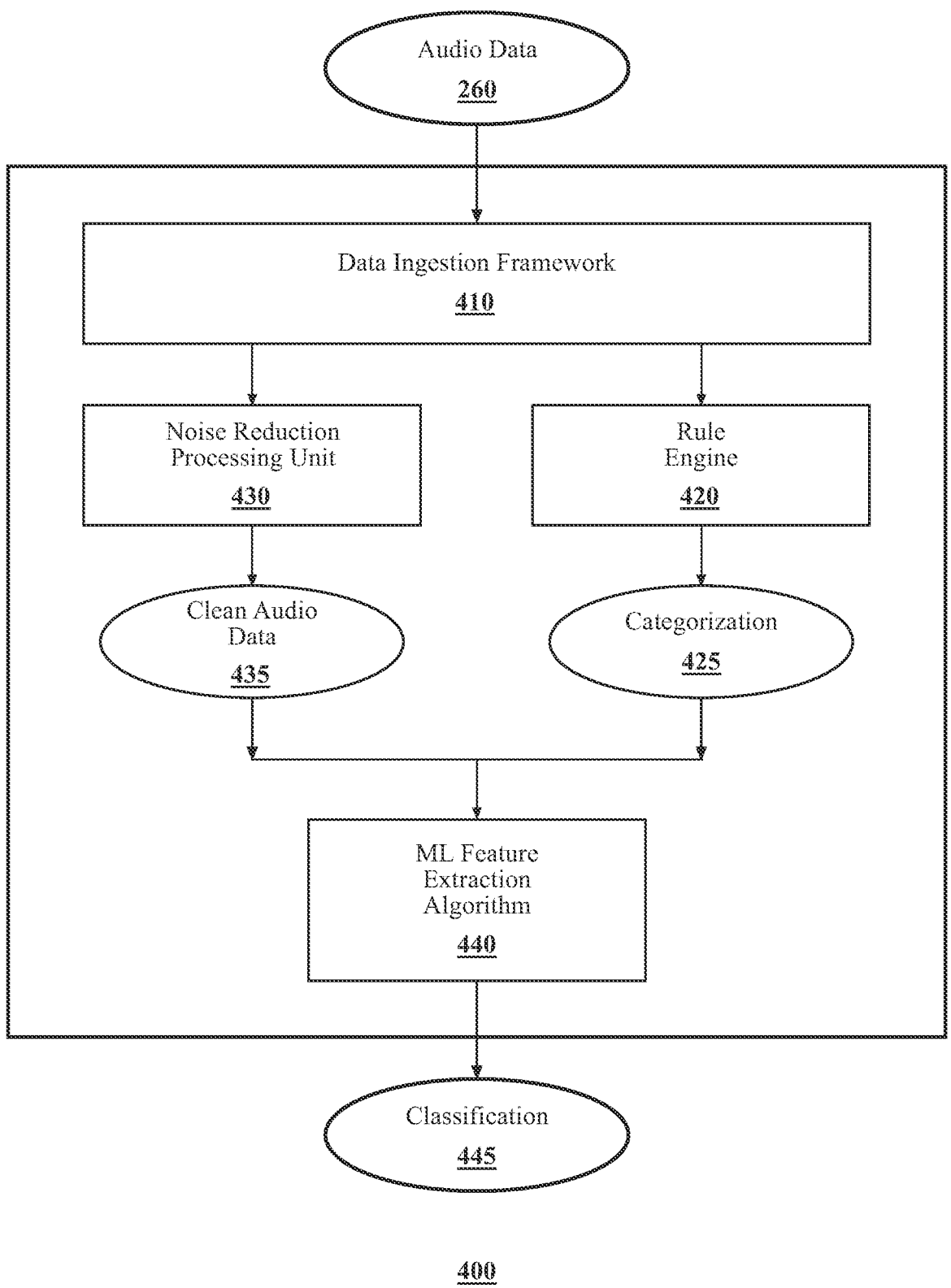
FIG. 4 illustrates an example analysis engine, according to the disclosed embodiments.

FIG. 4 shows an example analysis engine 400 according to the disclosed embodiments. The analysis engine 400 includes a data ingestion framework 410, a rule engine 420, a noise reduction processing unit 430, and a machine learning extraction algorithm 440. The analysis engine 400 can output a classification 445 associated with the audio data 260, where the classification 445 indicates a type or characterization of an audio event associated with the audio data 260. In one or more embodiments, the classification 445 can also indicate a level of intensity or engagement of the audio event.

The data ingestion framework 410 is configured to receive and process streaming audio data in real time for the purpose of identifying and tracking audio events. In one or more embodiments the data ingestion framework 410 can be implemented using a framework such as Apache Storm. The data ingestion framework 410 can include processing nodes that identify a pattern in continuous data as being part of an audio event.

The rule engine 420 is configured to analyze data associated with an audio event to determine a categorization 425 for the audio event according to a categorization schema. For example, the rule engine 420 can include rules that compare the audio event to data and data parameters representing known, broad categories (e.g., human speech between two participants, human speech between three participants, music playing, game playing, movie playing, construction sounds, traffic sounds, etc.) and thereby generally categorize the audio event in real time. In one or more embodiments, the rule engine 420 can be implemented as a Kafka rule engine. In one or more embodiments, the rule engine 420 can assign multiple categorizations 425 to an audio event, for example, when an audio event includes a mix of sounds from various sources.

The noise reduction processing unit 430 is configured to reduce noise from the audio event in preparation for more precise processing, for example, by using dynamic or sliding high-pass or low-pass filters, expanders, or other audio noise reduction techniques. The noise reduction processing unit 430 can output clean audio data 435.

The machine learning feature extraction algorithm 440 can include a machine learning algorithm (e.g., a neural network) trained to classify the audio event based on audio features extracted from the audio event. The features can be defined based on training data. The training data can include, for example, labeled audio data captured from multiple audio scenarios, such as: casual conversations, agitated conversations, playful arguments, angry arguments, shouting, screaming, giving navigational instructions, loud music playing, soft music playing, radio shows, video games, construction sounds, traffic sounds, weather sounds, etc. The audio features can include aspects, for example, such as tone, pitch, meter, timbre, cadence, quality, mechanical/biological nature, etc.

Accordingly, in one or more embodiments the machine learning feature extraction algorithm 440 can receive, as input, clean (i.e., noise reduced) audio data 435 associated with an audio event and/or one or more general categorizations 425 associated with the audio event. The machine learning feature extraction algorithm 440 can extract features from the clean audio data 435 and output one or more classifications 445 for the audio event. In one or more embodiments, a classification 445 can further indicate an estimated nature and/or an estimated level of intensity, engagement, passion or exhibited by an audio event.

FIG. 5 shows an example table 500 of extracted features 510, categorizations 515 and classifications 520. It should be understood that the extracted features 510, categorizations 515 and classifications 520 shown in table 500 are provided only as an exemplary implementation of the disclosed embodiments. Different implementations with different sets of extracted features 510, categorizations 515 and classifications 520 are within the scope of the disclosed subject matter. It should also be understood that the values of the extracted features 510, categorizations 515 and classifications 520 (e.g., "high", "medium", etc.) are simplified for the purposed of explanation. In actual implementation the values can have a greater degree of precision.

As shown in the table 500, the machine learning feature extraction algorithm 440 can extract features 510 such as pitch, cadence, volume, etc., from the audio data 260 representing the audio event. The machine learning feature extraction algorithm 440 can also receive one or more categorizations 515 of an audio event from the rule engine 420, such as source (e.g., human voice, traffic, weather, mechanical, etc.), number of participants (e.g., number of individual voices detected) and driver participant (e.g., whether the driver's voice is detected). The machine learning feature extraction algorithm 440 can determine classifications 520 for an audio event based on the extracted features 510 and, in one or more embodiments, based in part on the general categorization(s) 515 of the audio event as determined by the rule engine 420.

For example, the machine learning feature extraction algorithm 440 can determine a classification 530 of 'three passenger argument without the driver' for a given audio event based on categorizations 515 indicating human voice sources with three participants and no driver participation and extracted features 510 indicating high volume, medium cadence and medium pitch. In another example, the machine learning feature extraction algorithm 440 can determine a classification 540 of 'soft music playing' for another audio event based on categorizations 515 indicating vehicle speaker source with no participants detected and no driver participation and extracted features 510 indicating low volume, slow cadence and medium pitch.

Similarly, the machine learning feature extraction algorithm 440 can determine other example classifications indicating varying types and degrees of audio events, such as classification 550 ('two-passenger conversation with the driver'), classification 560 ('ambulance siren'), and classification 570 ('two-passenger heated argument without the driver').

The monitoring module 220 can use the classification 520 to determine a distraction rating for an audio event. In one or more embodiments, the distraction rating is a quantified value that indicates an estimated likelihood of the associated audio event causing a distraction to the driver.

In one or more embodiments the monitoring module 220 uses a rating formula based on factors of one or more of various classifications 520 and/or categorizations 515 associated with an audio event. In one or more embodiments, each factor is assigned a respective, scaled value indicating an estimated distraction potential. For example, on a 0-100 scale, a classification 550 of 'two-passenger conversation with the driver' can be assigned a value of 20, a classification 540 of 'soft music playing' can be assigned a value of 10, a classification 570 of 'two-passenger heated argument without the driver' can be assigned a value of 60, and so on.

In one or more embodiments, the factors may further be weighted to reflect considerations of overall comparative impact in terms of disruptive effect.

In an implementation the rating formula can be complex. However, for the purposes of explanation a simplified rating formula will be described as follows. In one implementation the rating formula can factor in: number of participants (N, a value from 0-n indicating number of individuals detected participating in the audio event), driver participation (D, a binary value of 1 or 0), classification value (C, predetermined assigned value per classification), each of which may be assigned respective weights (w1, w2, w3) to determine a distraction rating (D_Rating), e.g.:

$$Nw_1 + Dw_2 + Cw_3 = D\_Rating \qquad \text{Eq. 1}$$

Referring back to FIGS. 1 and 2, the alert module 230 determines whether the distraction rating exceeds a response threshold. In one or more embodiments, the alert module 230 can obtain contextual data 270 indicating one or more contextual aspects of the audio event and set the response threshold based at least in part on the contextual data 270. That is, recognizing that the same level of attentiveness is not required in all situations, the alert module 230 can account for this fact by considering available contextual information when determining at what point an audio event warrants a responsive action by the audio monitoring system 170.

In one or more embodiments the contextual data 270 can include, for example, data processed from sensor data 250 generated by the environment sensors 122 indicating external environment conditions, map data 116 indicating road topography, data from vehicle systems 140 indicating one or more states of the vehicle 100 (e.g., speed, acceleration, braking, etc.), and categorization of the audio event as determined by the rule engine 420 (FIG. 4). In one or more embodiments, the audio monitoring system 170 can further determine whether the driver is participating in the audio event, and the alert module 230 can consider this as part of the contextual data 270. For example, as a setup for the system 170, the driver can speak multiple phrases that can be used to train the machine learning feature extraction algorithm 440 and/or the rule engine 420 to recognize the driver's voice, thereby allowing the machine learning feature extraction algorithm 440 to further classify audio events as including driver participation or the rule engine 420 to categorize audio events as having driver participation.

Accordingly, in one or more embodiments the alert module 230 can use a formula to determine the response threshold. For example, the response threshold can be set to a default value T that is adjusted up or down based on the determination of one or more contextual factors. The alert module 230 can increase the response threshold based on factors which indicate decreased attention is required (e.g., low vehicle speed, light traffic, straight road, etc.) and decrease the response threshold based on factors that indicate heightened attention is required (e.g., inclement weather, high vehicle speed, curvy road, etc.). In one or more embodiments, the alert module 230 can dynamically adjust the response threshold according to the most recent contextual data 270.

In any case, when the distraction rating exceeds the response threshold, the alert module 230 can select one or more responses to activate from among a plurality of responses. The plurality of responses can include, for example, a generic audible response (e.g., a sound, beep, chime to catch attention), a direct audible response (e.g., audible warning directed to passengers) or a visual response (e.g., a warning displayed on a dashboard, window, screen or other display visible to the driver and/or passengers). The plurality of responses can vary in intensity. In one or more embodiments, the alert module 230 can select the response for an audio event based on one or more of the distraction rating, the audio event classification, how much the distraction rating exceeds the response threshold, and contextual information.

For example, in one or more embodiments when the distraction rating exceeds the response threshold by a first amount (e.g., 10), the alert module 230 can select a relatively lower intensity response, such as a beep or a chime. When the distraction rating exceeds the response threshold by a second amount (e.g., 20), the alert module 230 can select a relatively higher intensity response, such as playing an audio message corresponding to the classification of the audio event. For example, when the classification indicates the audio event involves passengers, the alert module 230 can play an audio message directed to the passengers (e.g., "Passengers, please be careful not to distract the driver that this time.") When the distraction rating exceeds the response threshold by a second amount (e.g., 20) and the contextual information indicates an environment that requires a high degree of operator attention (e.g., a thunderstorm, snow storm, etc.), the alert module 230 can select a highest intensity response, such as a visible warning combined with an audio message corresponding to the audio event classification.

Figure 3B:
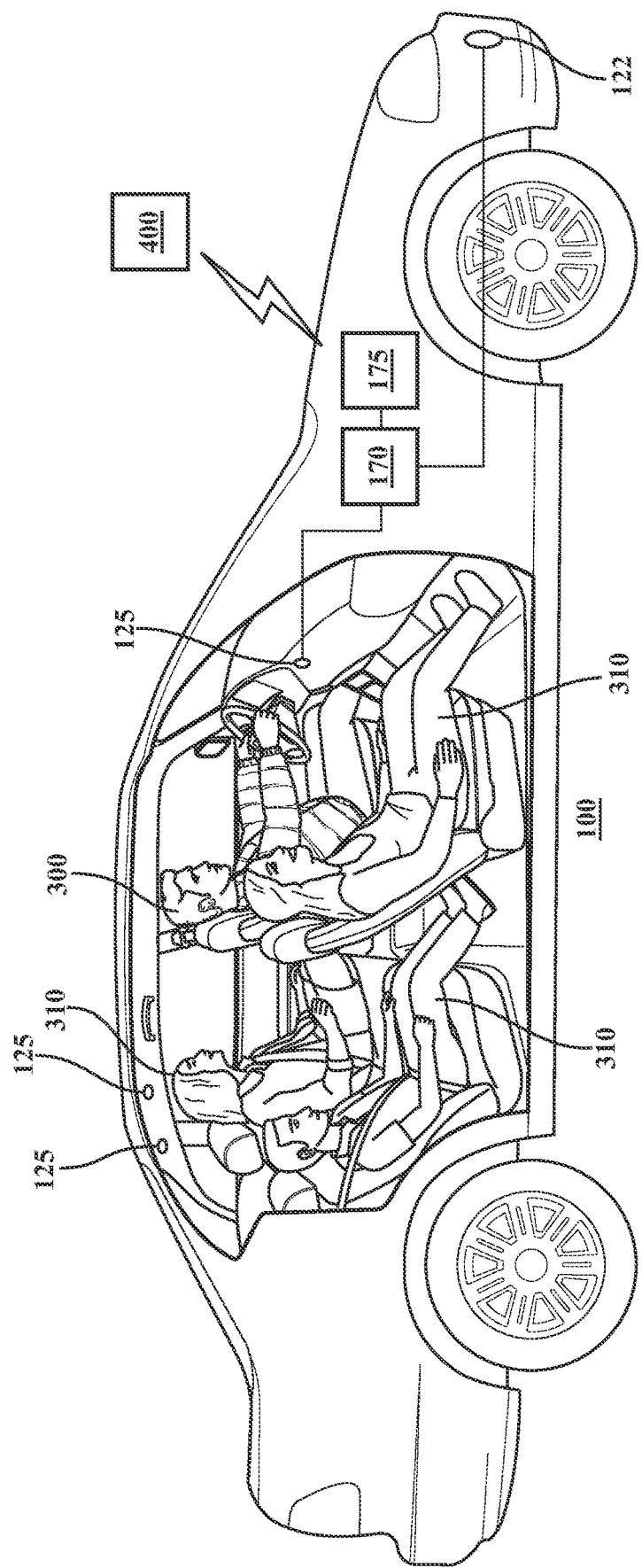
FIG. 3B illustrates a cutaway side view of a vehicle implementing an audio monitoring system and external analysis engine according to the disclosed embodiments.

In one or more embodiments, the audio monitoring system 170 can be configured to include the analysis engine 400 in a cloud-based server. This can allow vehicles that lack the processing power to accomplish real time processing to still implement an embodiment of the disclosed subject matter. FIG. 3B shows an example implementation of a vehicle 100 including the audio monitoring system 170 and a connection service 175 to connect the audio monitoring system 170 to a cloud-based analysis engine 400. The connection service 175 can be implemented, for example, as an IoT Core that allows the audio monitoring system 170 to communicate with that cloud-base analysis engine 400.

Accordingly, the disclosed audio monitoring system 170 can monitor audio data in real time, detect audio events, categorize and classify the audio events, determine a distraction rating for the audio events and, when the distraction rating exceeds a threshold, select and execute a responsive action to mitigate or reduce the distraction.

Figure 6:
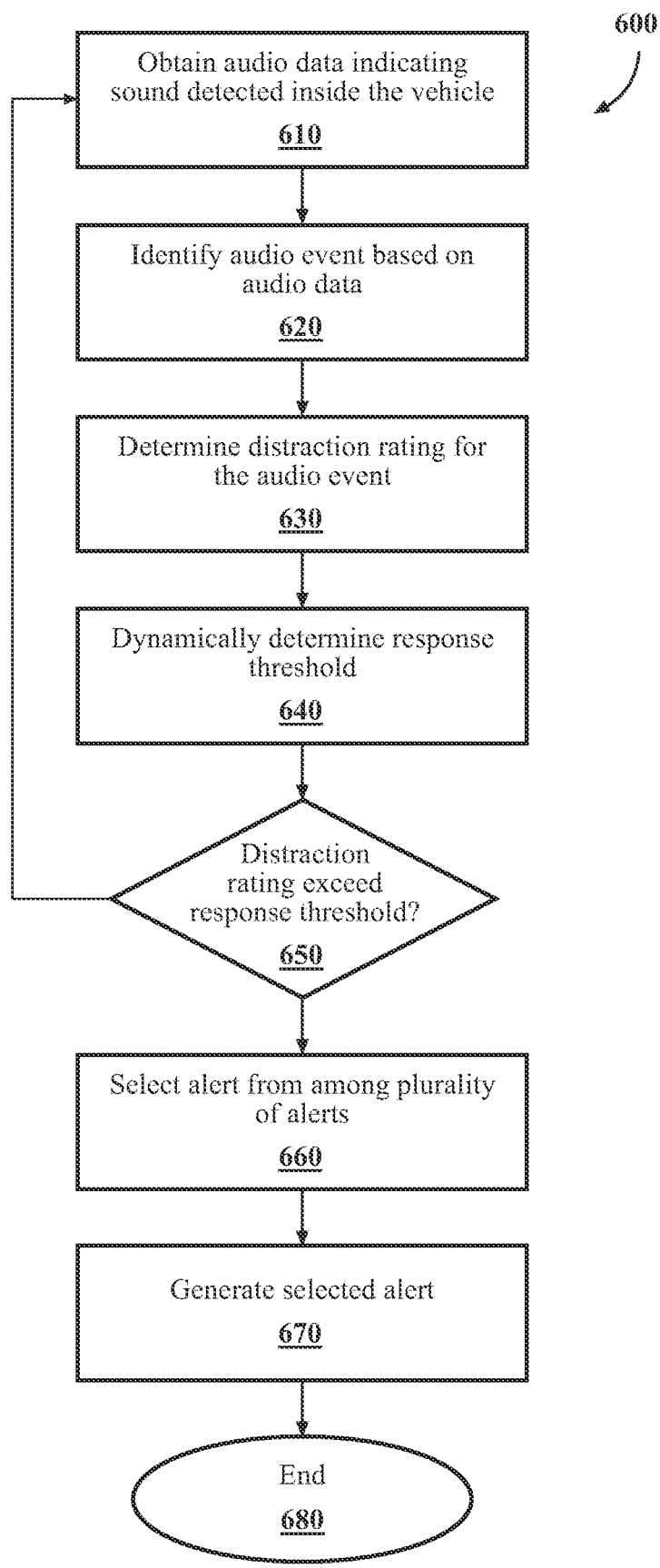
FIG. 6 illustrates an example flowchart of operations of an audio monitoring system, according to the disclosed embodiments.

FIG. 6 illustrates a flowchart of a method 600 of an audio monitoring system, according to the disclosed embodiments. Method 600 will be discussed from the perspective of the audio monitoring system 170 of FIGS. 1 and 2. While method 600 is discussed in combination with the audio monitoring system 170, it should be appreciated that the method 600 is also not limited to being implemented within the audio monitoring system 170 but is instead one example of a system that may implement the method 600.

At operation 610, the audio monitoring system 170 (e.g., monitoring module 220) obtains data audio data 260 based on sound detected inside the vehicle 100. For example, in one or more embodiments the monitoring module 220 obtains sensor data 250 generated by the environment sensor(s) 122 (e.g., one or more microphones 125 disposed in a cabin of the vehicle 100) indicating the sound.

At operation 620, the audio monitoring system 170 (e.g., monitoring module 220) identifies an audio event based on the audio data 260. For example, in one or more embodiments the monitoring module 220 can process samples of sensor data 250 in real time to search for patterns or trends that indicate occurrence of a recognized or known audio event, such as a conversation between individuals (i.e., passengers), music playing, etc.

At operation 630, the audio monitoring system 170 (e.g., monitoring module 220) determines a distraction rating for the audio event, the distraction rating indicating an estimated level of distraction caused by the audio event. In one or more embodiments the monitoring module 220 determines the distraction rating by transmitting the audio data 260 to an analysis engine 400 and receiving the distraction rating from the analysis engine 400.

In one or more embodiments the analysis engine 400 can be implemented in a cloud-based server or can be disposed in the vehicle 100. In one or more embodiments, the analysis engine 400 can include a data ingestion system that receives and processes the audio data 260 in real time to identify and continuously track the audio event. In one or more embodiments, the analysis engine 400 includes a rule engine 420 that determines a categorization 425 of the audio data 260 based on one or more rules, and the distraction rating is based at least in part on the categorization 425. In one or more embodiments, the analysis engine 400 includes a machine learning feature extraction algorithm 400 that receives at least the audio data 260 as input, extracts one or more features from the audio data 260 and determines a classification 445 for the audio event, and the distraction rating is based at least in part on the classification 445.

At operation 640, the audio monitoring system 170 (e.g., alert module 230) dynamically determines a response threshold. In one or more embodiments, the alert module 230 can determine the response threshold based on one more factors such as contextual information obtained from environment sensors 122 indicating aspects of an environment of the vehicle 100 (e.g., weather, traffic, etc.), data from vehicle systems 140 indicating a state of the vehicle 100 (e.g., speed, acceleration, turning state, etc.) and data indicating whether the driver is participating in the audio event.

At operation 650, the audio monitoring system 170 (e.g., alert module 230) determines whether the distraction rating exceeds the response threshold. When the alert module 230 determines that the distraction rating does not exceed the response threshold, the audio monitoring system 170 takes no responsive action and continues monitoring audio data 260.

At operation 660, when the alert module 230 determines that the distraction rating exceeds the response threshold, the audio monitoring system 170 (e.g., alert module 230) selects an alert from among a plurality of alerts. The plurality of alerts can include generic, passive alerts, such as bells, chimes, etc., and can include direct response alerts, such as audio and/or visual messages directed toward a source of the audio event. For example, a directed alert can include an audible message directed to the passengers or driver requesting that the party cease distracting behavior. In one or more embodiments, the plurality of alerts can include one or more of: a warning to a passenger of the vehicle 100 prompting the passenger to cease distracting a driver of the vehicle 100, an instruction to a passenger to take steps to mitigate distraction of the driver, and an instruction to the driver to cease engaging in a detected distraction.

At operation 670, the audio monitoring system 170 (e.g., alert module 230) generates the selected alert. The method ends at operation 680.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle capable of switching between manual and autonomous modes. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. In one or more embodiments, the vehicle 100 can activate the disclosed audio monitoring system 170 when the vehicle 100 switches from an autonomous mode to a manual operation mode.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116 accessible to the audio monitoring system 170. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117 accessible to the audio monitoring system 170. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120 that generate data which is accessible to the audio monitoring system 170. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles) and store the data as sensor data 250.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense environment data. "Environment data" includes data or information about the external environment in which an autonomous vehicle is located or one or more portions thereof. For example, the one or more environment sensors 122 can be configured to detect, quantify and/or sense entities and obstacles in at least a portion of the external environment of the vehicle 100 and/or information/data about such entities and obstacles. Such entities may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more microphones 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, system, element or arrangement or groups thereof that enable information/data to be presented to a vehicle passenger (e.g., a person, a vehicle passenger, etc.). For example, the output system 135 can provide passive or directed alerts from the audio monitoring system 170 to passengers and/or a driver of the vehicle 100.

The vehicle 100 can include one or more vehicle systems 140 accessible to the audio monitoring system 170. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the audio monitoring system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of entities, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An audio monitoring system, comprising:
a processor; and
a memory, communicably connected to the processor, storing:
   a monitoring module including instructions that, when executed by the processor, cause the processor to:
      identify, based on audio data based on sound detected inside a vehicle, an audio event; and
      determine a quantified value of a distraction rating for the audio event, the distraction rating indicating an estimated level of distraction caused by the audio event; and
   an alert module including instructions that, when executed by the processor, cause the processor to:
      dynamically adjust, in response to a change in contextual data based on a contextual aspect of the audio event, a quantified value of a threshold to produce a current quantified value of the threshold;
      generate an alert when the quantified value of the distraction rating exceeds the current quantified value of the threshold; and
      refrain from a generation of the alert when the quantified value of the distraction rating does not exceed the current quantified value of the threshold.

2. The audio monitoring system of claim 1, wherein the instructions to determine the distraction rating include instructions to determine the distraction rating by transmitting the audio data to an analysis engine and receiving the distraction rating from the analysis engine.

3. The audio monitoring system of claim 2, wherein the analysis engine includes a data ingestion system configured to receive and to process the audio data in real time to identify and to continuously track the audio event.

4. The audio monitoring system of claim 2, wherein the analysis engine includes a rule engine configured to determine a categorization of the audio data based on one or more rules.

5. The audio monitoring system of claim 2, wherein the analysis engine includes a machine learning extraction algorithm configured to receive at least the audio data as input, to extract one or more features from the audio data, and to determine a classification for the audio event.

6. The audio monitoring system of claim 1, wherein the alert module includes instructions to determine a type of alert to generate, from among a plurality of alerts, based at least in part on the distraction rating.

7. The audio monitoring system of claim 6, wherein the plurality of alerts includes one or more of:
a warning to a passenger of the vehicle prompting the passenger to cease distracting a driver of the vehicle,
an instruction to the passenger to take steps to mitigate distraction of the driver, or
an instruction to the driver to cease engaging in a detected distraction.

8. The audio monitoring system of claim 1, further comprising:
an environment sensor configured to detect an aspect of an environment of the vehicle, wherein the instructions to dynamically adjust the quantified value of the threshold include instructions to dynamically adjust the quantified value of the threshold based at least in part on sensor data generated by the environment sensor.

9. The audio monitoring system of claim 1, wherein the audio monitoring system is configured to be activated by an autonomous driving module of the vehicle in response to a detection of a switch to a manual operation of the vehicle.

10. The audio monitoring system of claim 3, wherein the data ingestion system comprises an Apache Storm framework.

11. The audio monitoring system of claim 4, wherein the rule engine comprises a Kafka rule engine.

12. The audio monitoring system of claim 5, wherein the machine learning extraction algorithm comprises a neural network.

13. A method, comprising:
obtaining audio data based on sound detected inside a vehicle;
identifying an audio event based on the audio data;
determining a quantified value of a distraction rating for the audio event, the distraction rating indicating an estimated level of distraction caused by the audio event;
dynamically adjusting, in response to a change in contextual data based on a contextual aspect of the audio event, a quantified value of a threshold to produce a current quantified value of the threshold;
generating an alert when the quantified value of the distraction rating exceeds the current quantified value of the threshold; and
refraining from a generation of the alert when the quantified value of the distraction rating does not exceed the current quantified value of the threshold.

14. The method of claim 13, wherein the determining the distraction rating comprises determining the distraction rating by:
transmitting the audio data to an analysis engine;
receiving the audio data, by the analysis engine, in real time to identify and to continuously track the audio event; and
determining, by the analysis engine, the distraction rating associated with the audio event.

15. The method of claim 14, further comprising:
determining, by the analysis engine, a categorization of the audio data based on one or more rules.

16. The method of claim 14, further comprising:
receiving, by a machine learning extraction algorithm, at least the audio data as input;
extracting, by the machine learning extraction algorithm, one or more features from the audio data; and
determining, by the machine learning extraction algorithm, a classification for the audio event.

17. The method of claim 13, further comprising determining a type of alert to generate, from among a plurality of alerts, based at least in part on the distraction rating.

18. The method of claim 17, wherein the plurality of alerts includes one or more of:
a warning to a passenger of the vehicle prompting the passenger to cease distracting a driver of the vehicle,
an instruction to the passenger to take steps to mitigate distraction of the driver, or
an instruction to the driver to cease engaging in a detected distraction.

19. The method of claim 13, further comprising:
detecting, with an environment sensor, an aspect of an environment of the vehicle, wherein the dynamically adjusting the quantified value of the threshold comprises dynamically adjusting the quantified value of the threshold based at least in part on sensor data generated by the environment sensor.

20. A non-transitory computer-readable medium for reducing audible distractions for a driver of a vehicle, including instructions that, when executed by one or more processors, cause the one or more processors to:
obtain audio data based on sound detected inside the vehicle;
identify an audio event based on the audio data;
determine a quantified value of a distraction rating for the audio event, the distraction rating indicating an estimated level of distraction caused by the audio event;
dynamically adjust, in response to a change in contextual data based on a contextual aspect of the audio event, a quantified value of a threshold to produce a current quantified value of the threshold;
generate an alert when the quantified value of the distraction rating exceeds the current quantified value of the threshold; and
refrain from a generation of the alert when the quantified value of the distraction rating does not exceed the current quantified value of the threshold.

21. The non-transitory computer-readable medium of claim 20, wherein the instructions to determine the distraction rating include instructions to:
transmit the audio data to an analysis engine;
receive the audio data, by the analysis engine, in real time to identify and to continuously track the audio event; and
determine, by the analysis engine, the distraction rating associated with the audio event.

22. The non-transitory computer-readable medium of claim 21, further comprising instructions to:
determine, by the analysis engine, a categorization of the audio data based on one or more rules.

23. The non-transitory computer-readable medium of claim 21, further comprising instructions to:
receive, by a machine learning extraction algorithm, at least the audio data as input;
extract, by the machine learning extraction algorithm, one or more features from the audio data; and
determine, by the machine learning extraction algorithm, a classification for the audio event.

24. The non-transitory computer-readable medium of claim 20, further comprising instructions to determine a type of alert to generate, from among a plurality of alerts, based at least in part on the distraction rating.

* * * * *

UNITED STATES PATENT AND TRADEMARK OFFICE
CERTIFICATE OF CORRECTION

| | |
|---|---|
| PATENT NO. | : 11,705,141 B2 |
| APPLICATION NO. | : 17/333616 |
| DATED | : July 18, 2023 |
| INVENTOR(S) | : Rohit Gupta et al. |

It is certified that error appears in the above-identified patent and that said Letters Patent is hereby corrected as shown below:

In the Claims

Claim 1, Lines 18 and 19: "threshold:" should be "threshold;".

Signed and Sealed this
Fifteenth Day of August, 2023

Katherine Kelly Vidal
*Director of the United States Patent and Trademark Office*